Patented Apr. 5, 1927.

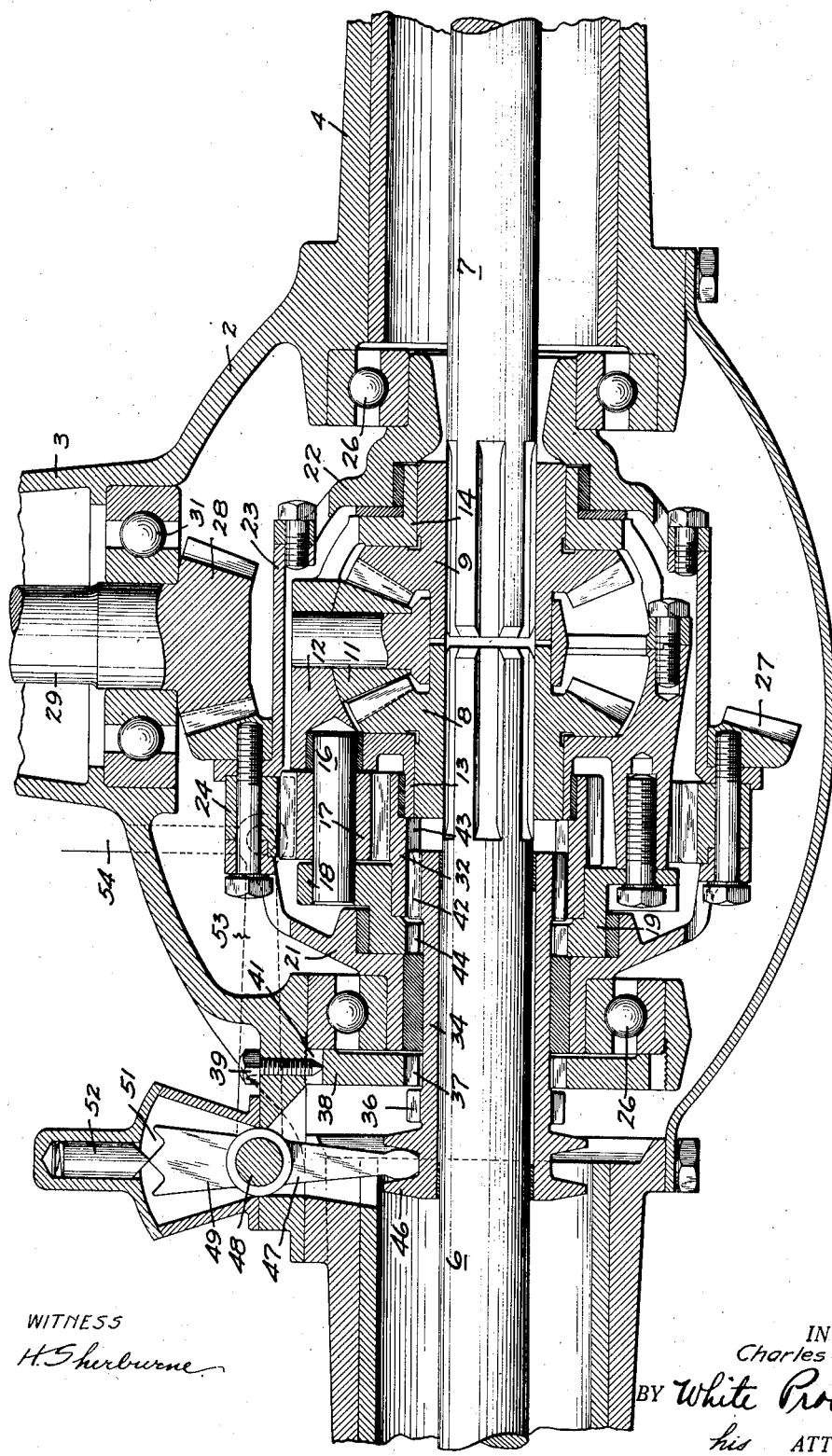

1,623,212

UNITED STATES PATENT OFFICE.

CHARLES E. STARR, OF OAKLAND, CALIFORNIA, ASSIGNOR TO PERFECTO GEAR DIFFERENTIAL CO., OF SEATTLE, WASHINGTON, A CORPORATION OF WASHINGTON.

TRANSMISSION MECHANISM.

Application filed May 10, 1922. Serial No. 559,697.

My invention relates to transmission mechanisms for motor driven vehicles and, particularly, to such mechanism in combination with a differential gear system.

One of the objects of the invention is the provision of a transmission mechanism of the character described embodying an improved relation and arrangement of parts. Another object of the invention is the provision of a transmission mechanism in which a speed change mechanism is combined with a differential gear system and embodying improved means for journaling the rotating elements.

My invention possesses many other objects and features of advantage, some of which, with the foregoing, will be set forth in the following description of my invention. It is to be understood that I do not limit myself to the showing made by the said description, as I may adopt variant forms of my invention within the scope of the claims.

Referring to the drawing, the figure of the drawing is a horizontal sectional view thru my transmission mechanism. The enclosing housing is the rear axle housing and the central shafts are the rear axles of a motor vehicle embodying my invention.

In broad outline, my invention comprises a combined planetary and differential gear system similar to that disclosed in my prior Patent No. 1,362,361, but embodying certain improved structures including improved means for mounting and controlling the inner gear and improved means for journaling the various rotating parts. My transmission mechanism is particularly adapted to be used as an auxiliary device in connection with the speed change mechanism of a well known type of car having a planetary transmission. With my mechanism four forward speeds and two reverse speeds are provided.

More particularly, the transmission of my invention comprises a housing 2 having an extension 3 forming part of the torque tube, and extensions 4 forming the housing for the rear axles 6 and 7, which extend outwardly to the driving wheels. Mounted on the adjacent ends of the alined shafts 6 and 7 are differential gears 8 and 9 respectively, connected by differential pinions of which one, 11, is shown mounted in the differential casing 12. The differential casing is formed with flanges 13 and 14 journaled respectively on hubs of gears 8 and 9.

Extending laterally from the side of the differential casing are studs 16, preferably three in number, on each of which is journaled a pinion 17. These pinions constitute the intermediate gears of the planetary system. Providing an outer bearing for the stud 16 is a ring 18, in which the outer ends of the studs are seated. The ring is formed with an annular flange 19, journaled in the end member 21, of the ring gear which comprises, in addition, the opposite end element 22 and the connecting cylindrical element 23. The ring gear casing is built up as shown on each side of the ring gear 24 of the planetary system, which is in mesh with the intermediate gears 17, and is journaled in suitable bearings 26 arranged in the main housing 2. On the ring gear casing also is secured the gear 27 driven by pinion 28 turned by the drive shaft 29, suitably journaled in bearings 31 in the fixed housing 2.

Having an outside bearing on the ring 18, and an inside bearing on the hub 13 of the differential casing is a sleeve 32 provided with spur teeth meshing with the intermediate gears 17, and comprising the inner gear of the planetary system. Since the ring 18 is really an extension of the differential casing being fixed thereto by the studs 16, the inner gear 32 may be considered to be journaled wholly upon the differential casing.

The ring gear and differential casings may be of closed or cage type, but suitable apertures are of course provided in these casings for the free distribution of lubricant to the various bearings. As shown in the drawings, I prefer to make free use of bushings between the bearing surfaces, using either the flat ring or the sleeve type.

From the above it will be apparent that by locking the inner gear against rotation, rotation of the ring gear casing by the driving pinion 28 will effect the rotation of the differential casing and axles 6 and 7 in accordance with the ratios of the meshing gears. Such an arrangement of parts gives the low speed of my device, and in combination with the main speed change mechanism gives two speeds, one lower and one higher than the usual low speed. If, on the other hand, the intermediate gears 17 are locked against rotation on their journal axes the ring gear casing and the differential casings are locked for rotation together as one unit. This arrangement of parts gives the high speed of my device, and in combination with the main speed change mechanism gives the usual high speed and the usual low speed.

Means are provided for locking the inner gear 32 against rotation, or for locking the intermediate gears 17 against rotation on their journaled axes. Journaled loosely on the shaft 6 is a sleeve 34 provided with clutch teeth 36 adapted to be engaged with teeth 37 formed on the fixed plate 38, which is preferably threaded into a seat formed in the main housing 2, and prevented from turning by a screw 39 seated in one of the V-grooves 41, closely spaced about the periphery of the plate. The sleeve 34 is also provided with key or spline teeth 42 permanently slidably engaged with complementary teeth 43 on the inside of the inner gear 32, so that the inner gear and the sleeve are fixed for rotation together, but the sleeve is capable of axial movement in respect of the inner gear. The teeth 42 also function as clutch members adapted to be engaged with clutch teeth 44 formed on the inside of flange 19.

It will be observed that if the sleeve 34 is moved to the right to engage the teeth or clutch members 36—37 the teeth 42 slide within the inner gear, which is therefore mediately locked to the housing and prevented from rotating. If the sleeve 34 is moved to the left, however, to engage the teeth or clutch members 42—44, a portion of the teeth 42 still remain engaged in the inner gear thus locking the inner gear for rotation with the ring 18, and by so doing preventing the rotation of the intermediate gears 17 on their journal axes. In the first case, the planetary gear system functions as such, driving the differential casing in the low speed combination of my mechanism. In the second case, the planetary gear system, as such, is inoperative, and all of the parts are locked together for rotation as one unit.

Means are provided for moving the sleeve 34 to the right or to the left to secure the results just explained. The sleeve is provided with spaced annular flanges 46 adapted to be engaged by the ball pointed end of the lever 47, mounted on the pivot pin 48, fixed in the housing, and having an oppositely extending arm 49 provided with notches 51 adapted to be engaged by the spring-pressed pin 52 to resiliently hold the lever in adjusted position. On the outside of the housing an arm 53 extends at substantially right angles to the arm 47, and is connected by a suitable link 54 with a control lever convenient to the driver's hand.

In the drawings, the parts are shown in neutral position, that is to say, the sleeve 34 is free to rotate on the shaft 6 at the same time not being in engagement with the locking ring 18. In this position the spring-pressed pin 52 impinges on the point between the notches 51. This is, of course, an arrangement of parts which would not occur for more than a fraction of a second during the operation of the control lever, the pin 52 lying in either one or the other of the notches 51. If desired, however, an intermediate notch may be provided in the arm 49 so that the parts may be brought to rest in a neutral position. In the hands of the general public, however, such an arrangement is not desirable.

It will be noted that in journaling the various elements within and upon each other, as shown, a very compact and sturdy mechanism is provided, which is found to be free from vibration and objectionable stresses, and excessive or uneven wear.

I claim:

1. The combination with a differential gear system of a planetary gear system having its intermediate gears journaled on the differential casing and a ring fixed for rotation with the differential casing, the inner gear of the planetary system being journaled on said ring and on said differential casing.

2. The combination with a differential gear system of a planetary gear system having its intermediate gears journaled on the differential casing and a ring for supporting the outer ends of the intermediate gear shafts journaled on the ring gear of the planetary system.

3. The combination with a differential gear system of a planetary gear system having its intermediate gears journaled on the differential casing, a casing for supporting the ring gear of the planetary system, and a ring for supporting the outer ends of the intermediate gear shafts journaled on said ring gear casing.

In testimony whereof, I have hereunto set my hand.

CHARLES E. STARR.